June 9, 1959  F. J. KAMPMEIER  2,890,083
GUIDE CONSTRUCTION

Filed Feb. 6, 1957  2 Sheets-Sheet 1

INVENTOR
Frederick J. Kampmeier
By Carlson, Pitzner, Hubbard & Wolfe
ATTORNEY

June 9, 1959   F. J. KAMPMEIER   2,890,083
GUIDE CONSTRUCTION
Filed Feb. 6, 1957   2 Sheets-Sheet 2
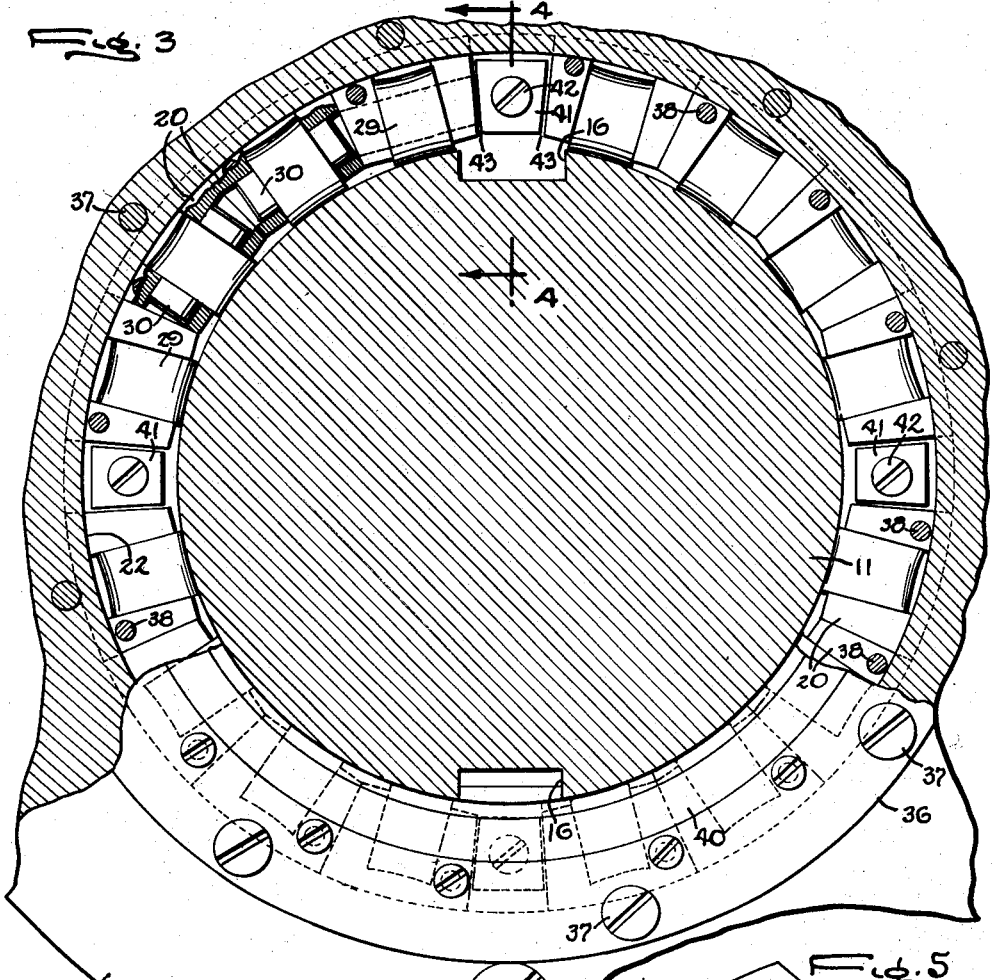
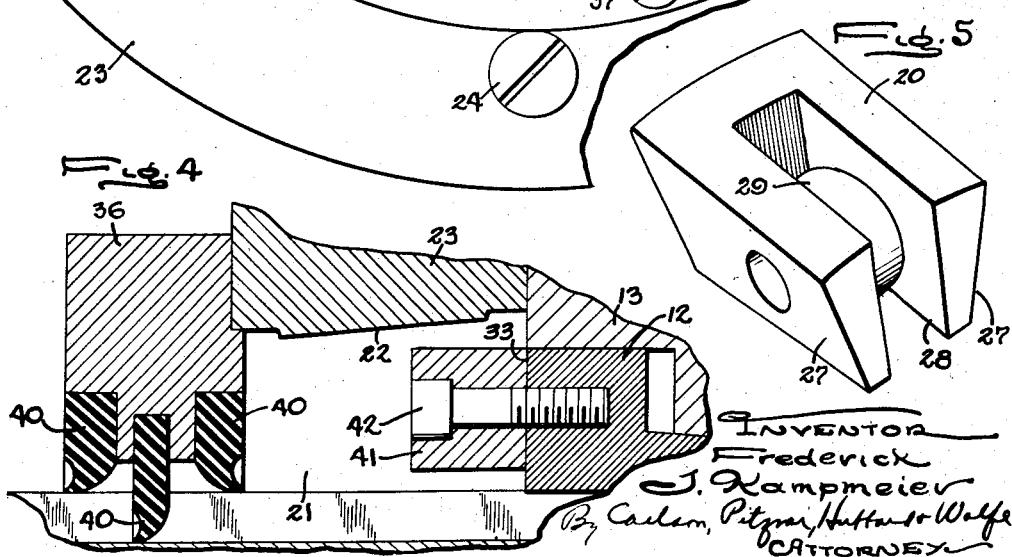
INVENTOR
Frederick
J. Kampmeier
By Carlson, Pitzner, Hubbard + Wolfe
ATTORNEYS

United States Patent Office 2,890,083
Patented June 9, 1959

2,890,083
GUIDE CONSTRUCTION

Frederick J. Kampmeier, Rockford, Ill., assignor to The Ingersoll Milling Machine Company, Rockford, Ill., a corporation of Illinois Application February 6, 1957, Serial No. 638,554

4 Claims. (Cl. 308—6)

This invention relates to a guide or bearing structure for supporting an elongated bar for projection different distances outwardly beyond the end of the guide.

The primary object is to provide in a mounting of the above character, a new and improved device for reducing vibration of the overhanging portion of the supported bar.

Another object is to apply a multiplicity of radially directed force components to the supported bar at points spaced angularly around the latter and disposed adjacent to the end of the guide.

A more detailed object of the present invention is to support the bar solidly in its guide through the use of an angularly arranged series of spring-biased wedges.

A further object is to derive the force components from an angular series of spring biased wedges.

Still another object is to maintain the wedges in groups separated from each other in a novel manner so as to insure uniform distribution of the forces exerted on the supported bar.

The invention also resides in the novel construction of the wedges to avoid binding thereof in service use.

Figure 1:
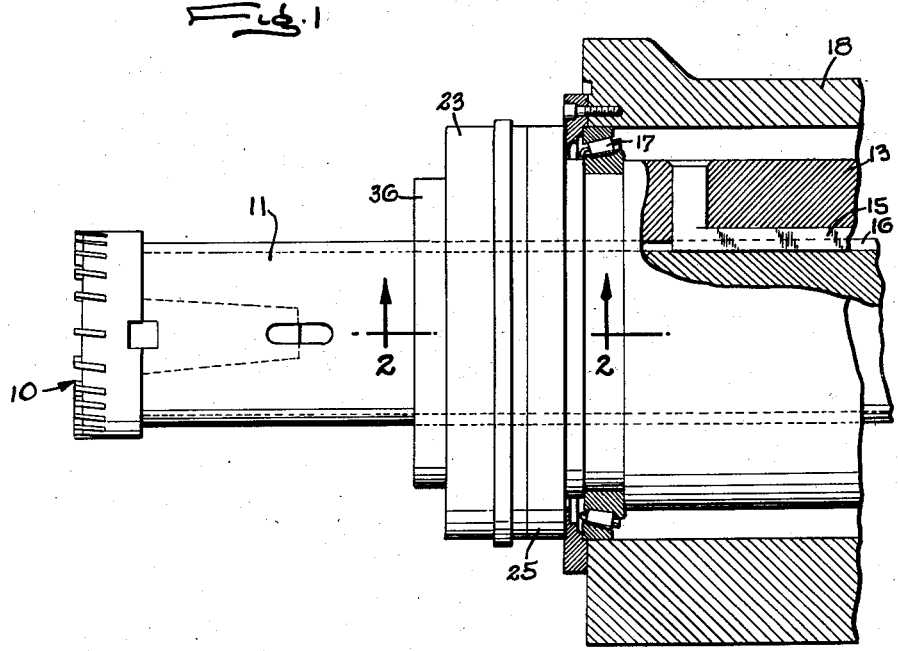

Other objects and advantages of the invention will become apparent from the following detailed description taken in connection with the accompanying drawings, in which Figure 1 is a fragmentary side elevational view of the improved cutter mounting with parts broken away and shown in section.

Figure 2:
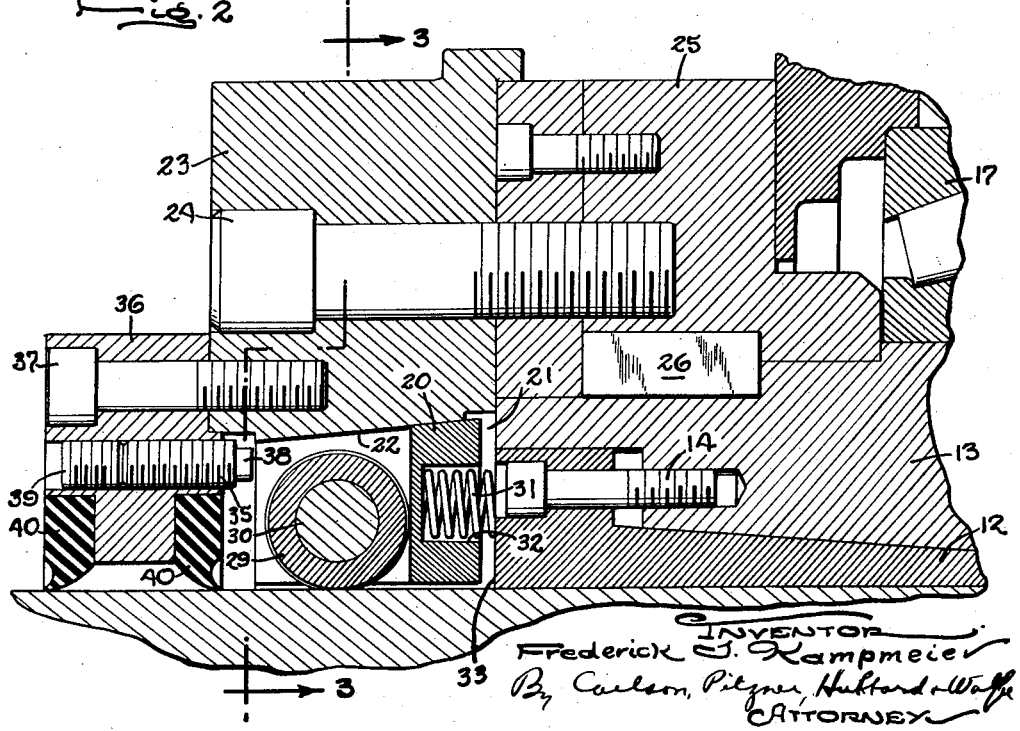

Figs. 2, 3 and 4 are of fragmentary sections taken along the lines 2—2, 3—3 and 4—4 of Figs. 1, 2 and 3.

Fig. 5 is a perspective view of one of the wedges.

In the guide structure selected for illustrating the invention, a rotary milling cutter 10 keyed in the usual manner to the outer overhanging end of a rotary spindle or bar 11 slidable endwise in a tapered bushing 12 telescoped into a drive sleeve 13. Looseness in the guide thus formed may be taken up from time to time by tightening screws 14 thus contracting the bushing 12 around the spindle. Through a key 15 projecting into a longitudinal groove 16, the spindle is splined into the drive sleeve for rotation therewith. Bearings 17 axially spaced along the sleeve support the latter in a quill 18 or other suitable mounting.

As applied to a mounting of the above character, the present invention contemplates reducing or minimizing vibration of the overhanging portion of the spindle through the application to the latter of a multiplicity of force components angularly spaced around the spindle and directed against the outer peripheral surface thereof at points spaced from the outer end of the guide 12. These components are derived through the action of wedges 20 arranged side by side around the spindle within an annular recess 21 defined by the spindle and the internal axially tapered wall 22 of a rigid ring 23 secured against the end of the drive sleeve 13. Hereon the ring fits over and is clamped by screws 24 to a flange 25 keyed at 26 to the outer end of the drive sleeve.

Each wedge 20 comprises a block of metal transversely curved to complement the curvature of and seat against the wall 22. Opposite sides 27 of the wedge converge inwardly so as to be disposed substantially radially and abut the sides of the adjacent wedges. One end portion of each wedge is slotted longitudinally as indicated at 28 to receive a roller 29 journaled on a trunnion 30 which is carried by the wedge and extends tangentially of the spindle. The trunnion is located on the wedge so as to project the inner part of the roller inwardly beyond the wedge for engagement with the periphery of the spindle, the periphery of the roller being curved longitudinally to fit the spindle contour.

The individual wedges are urged along the spindle by separately applied pressures derived in the present instance from compression springs 31 disposed in recesses 32 in the ends of the wedges and acting against the outer end 33 of the guide bushing 12. The springs thus urge the wedges along the spindle and against the tapered wall 22 thus causing the rollers 29 to exert against the spindle periphery, inwardly and radially directed forces of greatly increased magnitudes. As a result, the wedges are always seated solidly against the wall 22 of the ring 23 so that the rollers 29 hold the spindle rigidly against lateral vibration which might otherwise be permitted due to wear or other looseness in the spindle guide structure. By virtue of the rolling contact between the wedges and the spindle there is no danger of binding between the two in spite of the relatively small taper of the wedges. The spindle is thus free to slide back and forth through the guide 12 and the wedges. Means is provided for limiting outward movement of the wedges during an abnormally long outward shifting of the spindle. This means comprises stop screws 35, one for each wedge, threaded to a separate flange 36 clamped by screws 37 to the outer end of the ring 23 and projecting inwardly to close the outer end of the wedge recess. The ends 38 of the screws form abutments which are adjusted from time to time in service and are disposed only a short distance outwardly beyond the wedges in the retracted position of the latter. As a result, the wedges may, during outward movement of the spindle through a substantial distance, be advanced far enough to come against the stops 38 but will be prevented by the latter from becoming wedged so tightly between the ring 23 and the spindle as to permit ready release of the wedges upon retraction of the spindle. The adjusted positions of the stop screws is retained by lock screws 39. The flange 36 may also be utilized as a support for wipers 40 for preventing entry of foreign particles into the keyway 16 and the wedge recess 21.

In another of its aspects, the invention contemplates dividing the wedges 20 into annularly spaced groups so as to insure a substantially uniform angular distribution of the snubbing forces. For this purpose, spacers 41 are spaced angularly around the spindle at 90 degree intervals in the present instance and disposed within the recess 21 between adjacent ones of the wedges 20. These spacers take the form of blocks clamped by screws 42 and doweled if desired against the end of the spindle guide 12 as shown in Fig. 4. The angular space intervening between adjacent blocks is slightly greater than the combined circumferential widths of the intervening wedges, thus leaving narrow clearances 43 which allow ample freedom for the desired movement of the wedges. At the same time, the spacers prevent shifting of all of the wedges around the spindle in the same direction and the concentration of the clearance at one point. Uniformity of the distribution of the snubbing forces derived from the action of the wedges is thus achieved.

I claim as my invention:

1. The combination with an elongated bar, a guide slidably supporting said bar cantilever fashion for endwise movement to project the bar different distances beyond the end of the guide, an annular ring encircling said bar and secured against said guide end, said ring defining an annular recess around said bar and having an inner wall converging away from said guide end, a plurality of wedges disposed in and angularly spaced around said recess and mating with said wall, rollers journaled on the respective wedges to turn about tangentially disposed axes spaced outwardly from said bar, said rollers projecting inwardly from said wedges and engaging said bar, springs, one for each of said wedges, acting in compression between the wedges and said guide end to roll said wedges along the bar in the direction of convergence of said wall, and selectively adjustable stops, one for each of said wedges, acting to positively limit movement of the wedges by said springs.

2. The combination with an elongated bar, a guide slidably supporting said bar cantilever fashion for endwise movement to project the bar different distances beyond the end of the guide, an annular ring encircling said bar and secured against the guide end, said ring defining an annular recess around said bar and having an inner wall concentric with and coverging along the axis of said bar, a plurality of wedges disposed side by side in said recess and seated against said wall, springs, one for each of said wedges, acting in compression between the wedges and said guide end to urge said wedges along the bar and against said wall, and a plurality of spacers rigid with said ring and angularly spaced around said axis, said spacers being disposed between adjacent ones of said wedges and dividing the wedges into a plurality of angularly spaced groups.

3. The combination with an elongated bar, a guide slidably supporting said bar cantilever fashion for endwise movement to project the bar different distances beyond the end of the guide, an annular ring encircling said bar and secured against said guide end, said ring defining an annular recess around said bar and having an internal wall concentric with the bar axis and converging away from said guide end, a plurality of wedges disposed in and angularly spaced around said recess and seated against said wall, rollers journaled on the respective wedges to turn about tangentially disposed axes spaced outwardly from said bar, said rollers projecting inwardly from said wedges and engaging said bar, and springs, one for each of said wedges, acting in compression between the wedges and said guide end to roll said wedges along the bar and against said wall.

4. The combination with an elongated bar, a guide slidably supporting said bar cantilever fashion for endwise movement to project the bar different distances beyond the end of the guide, an annular ring encircling said bar and secured against said guide end, said ring defining an annular recess around said bar and having an inner wall concentric with and converging along the axis of said bar, a plurality of wedges disposed in and angularly spaced around said recess and seated against said wall, rollers journaled on the respective wedges to turn about tangentially disposed axes spaced outwardly from said bar, said rollers projecting inwardly from said wedges and engaging said bar, and means urging said wedges individually along said axis to seat said wedges against said converging wall with said rollers in engagement with the bar.

References Cited in the file of this patent

UNITED STATES PATENTS

| | | |
|---|---|---|
| 258,042 | Ferrall | May 16, 1882 |
| 2,583,264 | Herrmann | Jan. 22, 1952 |
| 2,765,175 | Parker et al. | Oct. 2, 1956 |